No. 712,007. Patented Oct. 28, 1902.
A. SCHIFF.
DRYING APPARATUS.
(Application filed Apr. 9, 1901.)

(No Model.)

Witnesses:

Inventor:
Abraham Schiff
by R. Hadden
Attorney

UNITED STATES PATENT OFFICE.

ABRAHAM SCHIFF, OF MOSYR, RUSSIA.

DRYING APPARATUS.

SPECIFICATION forming part of Letters Patent No. 712,007, dated October 28, 1902.

Application filed April 9, 1901. Serial No. 55,073. (No model.)

*To all whom it may concern:*

Be it known that I, ABRAHAM SCHIFF, a subject of the Emperor of Russia, residing and having my post-office address at Mosyr, in the Empire of Russia, have invented certain new and useful Improvements in Drying Apparatus, of which the following is a specification.

The present invention relates to an apparatus for drying material which can be spread out in layers, but which does not easily give off its moisture. This apparatus mainly comprises a chamber in the lower part of which a heating arrangement is provided by which the air entering at the bottom is heated. This air then passes through the material spread out on different levels and leaves the apparatus at the top. The drying action and absorption are assisted by wings revolving on a vertical shaft.

Figure 1:
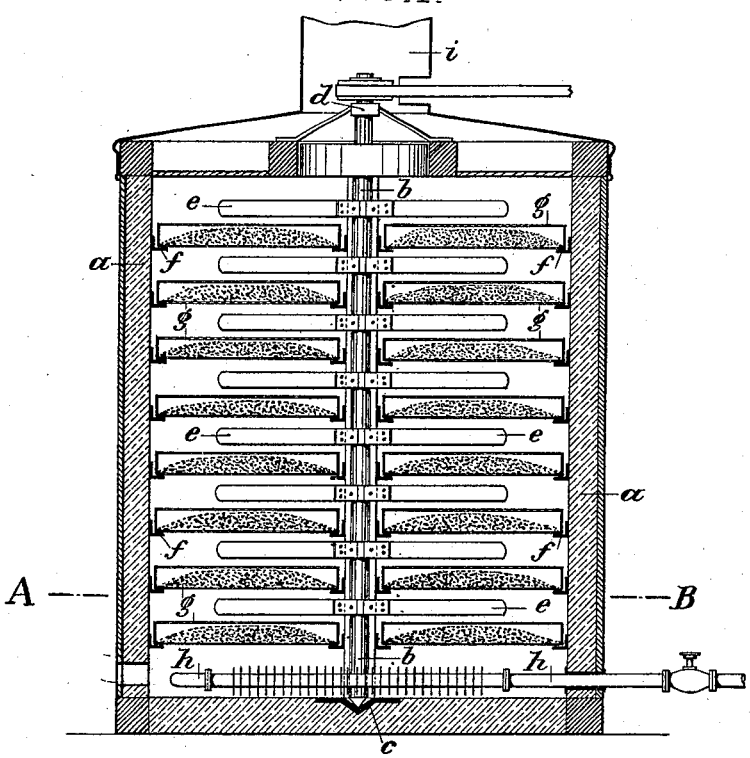
Figure 2:
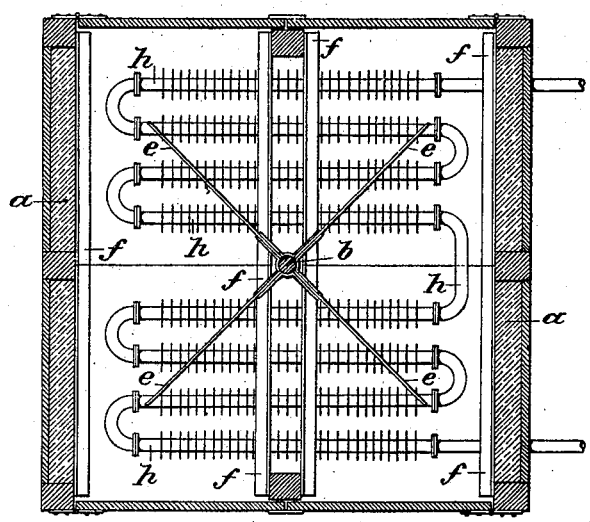

In the annexed drawings one form of the apparatus is represented, Figure 1 being a vertical longitudinal section thereof, and Fig. 2 a horizontal section on the line A B of Fig. 1 with the trays removed.

The construction and arrangement of the apparatus is as follows:

In the example shown in the drawings the chamber $a$ is quadrangular for the sake of convenience, and the walls are made of material which does not easily absorb water. In this chamber a vertical shaft $b$ revolves in a step-bearing $c$ and is prevented from oscillating by a collar-bearing $d$. To said vertical shaft $b$ wings $e$ are fastened. Between the wings $e$ trays $g$, with perforated bottoms and covers, are supported by angle-irons $f$. On these trays $g$ the material to be dried is placed. In the lower part of the chamber the heating arrangement $h$ is provided, which heats the air also entering at the lower part of the apparatus. After passing through the trays $g$ this air passes out of the chimney $i$ or is drawn off there. The wings $e$ not only serve to dry the material on the trays, but at the same time, particularly if inclined, increase the passage of air through the apparatus.

It is advisable to provide the covers of the trays $g$ with hinges in order to facilitate the putting in and taking out of the material to be dried.

If necessary, an exhauster may be provided in the chimney $i$.

I declare that what I claim is—

In combination, a drying-chamber, openings at the lower part of the walls of such chamber, means for heating the air passed into the chamber, a series of trays located one above the other, a shaft arranged vertically within said chamber, a plurality of radiating blades on said shaft, between each two of the trays, the flat faces of said blades being directed vertically, an exhaust-opening in the ceiling of the said chamber, an air-propeller, secured to said shaft and located within said opening, a chimney provided in vertical line with said shaft, means for supporting such chimney on the apparatus, and further means for rotating said shaft substantially as described.

In witness whereof I have signed this specification in the presence of two witnesses.

ABRAHAM SCHIFF.

Witnesses:
  H. LOVIAGUINE,
  DAVID B. MACGOWAN.